United States Patent
Mussro et al.

(10) Patent No.: US 9,178,232 B2
(45) Date of Patent: Nov. 3, 2015

(54) FCS OVERALL EFFICIENCY BY USING STORED CATHODE OXYGEN DURING DOWN-TRANSIENTS

(71) Applicant: GM GLOBAL TECHNOLOGY OPERATIONS LLC, Detroit, MI (US)

(72) Inventors: Joseph Mussro, Pittsford, NY (US); Yanyan Zhang, Victor, NY (US); Daniel C. Di Fiore, Scottsburg, NY (US)

(73) Assignee: GM Global Technology Operations LLC, Detroit, MI (US)

( * ) Notice: Subject to any disclaimer, the term of this patent is extended or adjusted under 35 U.S.C. 154(b) by 355 days.

(21) Appl. No.: 13/844,205

(22) Filed: Mar. 15, 2013

(65) Prior Publication Data

US 2014/0272644 A1    Sep. 18, 2014

(51) Int. Cl.
*H01M 8/04*    (2006.01)
*H01M 8/10*    (2006.01)

(52) U.S. Cl.
CPC ........ *H01M 8/04395* (2013.01); *H01M 8/0441* (2013.01); *H01M 8/0491* (2013.01); *H01M 8/04559* (2013.01); H01M 2008/1095 (2013.01); Y02E 60/50 (2013.01)

(58) Field of Classification Search
CPC ................. H01M 8/04753; H01M 8/04761; H01M 8/04089
See application file for complete search history.

(56) References Cited

U.S. PATENT DOCUMENTS

| | | | |
|---|---|---|---|
| 6,306,531 B1 * | 10/2001 | Clingerman et al. | 429/416 |
| 2004/0096709 A1 * | 5/2004 | Darling et al. | 429/13 |
| 2005/0164048 A1 * | 7/2005 | Wheat et al. | 429/13 |
| 2005/0186457 A1 * | 8/2005 | Clingerman et al. | 429/24 |
| 2005/0233182 A1 * | 10/2005 | Fuss et al. | 429/12 |
| 2011/0087441 A1 * | 4/2011 | Salvador et al. | 702/24 |

\* cited by examiner

*Primary Examiner* — Stewart Fraser
*Assistant Examiner* — Olatunji Godo
(74) *Attorney, Agent, or Firm* — John A. Miller; Miller IP Group, PLC

(57) ABSTRACT

A system and method for utilizing a pressurized volume of oxygen in a cathode plumbing of a fuel cell system. The system and method includes calculating an air/oxygen balance that is based on an air balance and an oxygen balance in the cathode plumbing. The system and method further include determining the number of moles of oxygen available for fuel cell chemical reactions using the calculated air/oxygen balance and drawing current from a fuel cell stack using the moles of oxygen available for fuel cell chemical reactions.

19 Claims, 1 Drawing Sheet

FCS OVERALL EFFICIENCY BY USING STORED CATHODE OXYGEN DURING DOWN-TRANSIENTS

BACKGROUND OF THE INVENTION

1. Field of the Invention

This invention relates generally to a system and method for improving an overall efficiency of a fuel cell system using stored cathode oxygen and, more particularly, to a system and method for utilizing a pressurized volume of oxygen that is available in cathode plumbing of the fuel cell system to produce energy that is provided to fuel cell system components.

2. Discussion of the Related Art

Hydrogen is a very attractive fuel because it is clean and can be used to efficiently produce electricity in a fuel cell. A hydrogen fuel cell is an electro-chemical device that includes an anode and a cathode with an electrolyte there between. The anode receives hydrogen gas and the cathode receives oxygen or air. The hydrogen gas is dissociated at the anode catalyst to generate free protons and electrons. The protons pass through the electrolyte to the cathode. The protons react with the oxygen and the electrons at the cathode catalyst to generate water. The electrons from the anode cannot pass through the electrolyte, and thus are directed through a load to perform work before being sent to the cathode.

Proton exchange membrane fuel cells (PEMFC) are a popular fuel cell for vehicles. The PEMFC generally includes a solid polymer electrolyte proton conducting membrane, such as a perfluorosulfonic acid membrane. The anode and cathode typically, but not always, include finely divided catalytic particles, usually a highly active catalyst such as platinum (Pt) that is typically supported on carbon particles and mixed with an ionomer. The catalytic mixture is deposited on opposing sides of the membrane. The combination of the anode catalytic mixture, the cathode catalytic mixture and the membrane define a membrane electrode assembly (MEA). MEAs are relatively expensive to manufacture and require certain conditions for effective operation.

Several fuel cells are typically combined in a fuel cell stack to generate the desired power. For example, a typical fuel cell stack for a vehicle may have two hundred or more stacked fuel cells. The fuel cell stack receives a cathode input gas, typically a flow of air forced through the stack by a compressor. Not all of the oxygen is consumed by the stack and some of the air is output as a cathode exhaust gas that may include water as a stack by-product. The fuel cell stack also receives an anode hydrogen input gas that flows into the anode side of the stack.

A fuel cell stack includes a series of bipolar plates positioned between the several MEAs in the stack, where the bipolar plates and the MEAs are positioned between two end plates. The bipolar plates include an anode side and a cathode side for adjacent fuel cells in the stack. Anode gas flow fields are provided on the anode side of the bipolar plates that allow the anode reactant gas to flow to the respective MEA. Cathode gas flow fields are provided on the cathode side of the bipolar plates that allow the cathode reactant gas to flow to the respective MEA. One end plate includes anode gas flow channels, and the other end plate includes cathode gas flow channels. The bipolar plates and end plates are made of a conductive material, such as stainless steel or a conductive composite. The end plates conduct the electricity generated by the fuel cells out of the stack. The bipolar plates also include flow channels through which a cooling fluid flows.

Proper airflow measurement and control to the cathode side of a fuel cell stack is critical for the operation of a fuel cell system. If too much air is delivered to the stack, energy is wasted and the fuel cells in the stack may become too dry, affecting fuel cell durability. Too little air delivered to the stack can result in fuel cell instability due to oxygen starvation. Therefore, fuel cell systems typically employ an airflow meter in the cathode input line or cathode output line to provide an accurate measurement of the flow of air to the fuel cell stack. If the airflow meter fails, it has typically been necessary to shut the fuel cell system down because by not knowing the amount of air being delivered to the fuel cell stack with enough accuracy could have detrimental effects on system components.

During a fuel cell system power down-transient, stack current is often reduced abruptly, thereby leaving unreacted pressurized oxygen available in the cathode plumbing volume because the pressure in the cathode plumbing does not drop immediately. Normally the pressurized oxygen is released out of a backpressure control valve and wasted. Thus, there is a need in the art for a way to utilize the pressurized oxygen available in the cathode plumbing such that energy is created from the pressurized oxygen instead of simply releasing and wasting the oxygen.

SUMMARY OF THE INVENTION

In accordance with the teachings of the present invention, a system and method are disclosed for utilizing a pressurized volume of oxygen in a cathode plumbing of a fuel cell system that includes calculating an air/oxygen balance that is based on an air balance and an oxygen balance in the cathode plumbing. The system and method further include determining the number of moles of oxygen available for fuel cell chemical reactions using the calculated air/oxygen balance and drawing current from a fuel cell stack using the moles of oxygen available for fuel cell chemical reactions.

Additional features of the present invention will become apparent from the following description and appended claims, taken in conjunction with the accompanying drawings.

DETAILED DESCRIPTION OF THE EMBODIMENTS

The following discussion of the embodiments of the invention directed to a system and method for improving an overall efficiency of a fuel cell system using stored cathode oxygen is merely exemplary in nature, and is in no way intended to limit the invention or its applications or uses.

Figure 1:
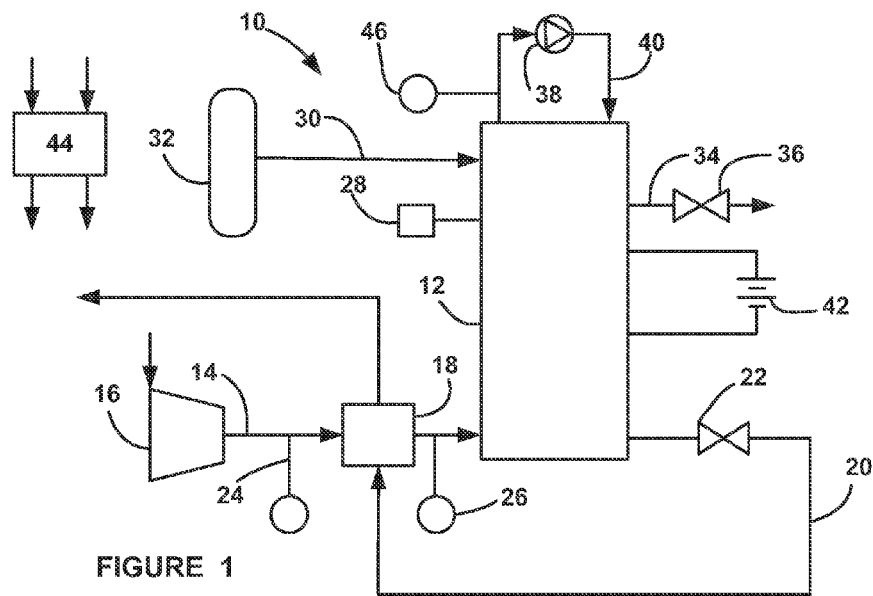
FIG. 1 is a schematic block diagram of a fuel cell system.

FIG. 1 is a schematic block diagram of a fuel cell system 10 including a fuel cell stack 12. A compressor 16 provides an airflow to the cathode side of the fuel cell stack 12 on a cathode input line 14 through a water vapor transfer (WVT) unit 18 that humidifies the cathode input air. The WVT unit 18 is one type of applicable humidification device, where other types of humidification devices may be applicable for humidifying the cathode inlet air, such as enthalpy wheels, evaporators, etc. A cathode exhaust gas is output from the stack 12 on a cathode exhaust gas line 20 through a backpressure valve 22. The exhaust gas line 20 directs the cathode exhaust to the WVT unit 18 to provide the humidity to humidify the cathode input air. A cathode pressure sensor 24 is provided in the cathode input line 14 to measure the pressure in the cathode side of the stack 12. A cathode airflow meter 26 is also provided in the cathode input line 14 to measure the flow of air to the cathode side of the stack 12. Alternatively, the cathode airflow meter 26 may be provided in the cathode exhaust line 20 upstream of the back-pressure valve 22. A voltage meter 28 measures an average cell voltage and a minimum cell voltage of the fuel cells in the stack 12.

The anode side of the fuel cell stack 12 receives hydrogen gas from a hydrogen source 32 on an anode input line 30 and provides an anode exhaust gas on line 34 through a valve 36, such as a bleed valve, purge valve, etc. A pump 38 pumps a cooling fluid through the stack 12 and a coolant loop 40 external to the stack 12. A temperature sensor 46 measures the temperature of the cooling fluid exiting the stack 12. A power source 42, such as a battery, is included to provide a current flow through the stack 12. The power source 42 may receive current from the stack 12 for charging purposes. A controller 44 controls fuel cell system components, such as the compressor 16 and the back-pressure valve 22. The controller 44 also receives inputs from the cathode pressure sensor 24, the cathode airflow meter 26, and the voltage meter 28. The controller 44 additionally performs other system 10 functions, including the algorithm discussed in detail below.

During a power down-transient of the fuel cell system 10, the stack current is often reduced abruptly. The abrupt reduction in stack current leaves unreacted pressurized oxygen available in the cathode inlet line 14, the cathode side of the stack 12, and the cathode exhaust line 20, collectively referred to as the cathode plumbing. Typically, the pressurized oxygen is released out of the back-pressure valve 22 and wasted because, according to known algorithms, the maximum current that can be drawn from the fuel cell stack 12 is determined by the airflow through the air inlet flow meter 26. Thus, according to the known algorithms, the pressurized oxygen that is available in the cathode plumbing was not considered when determining a maximum current draw from the fuel cell stack 12. However, in reality the stack 12 may have a large amount of pressurized oxygen available during the beginning of a power down-transient due to stack capacity.

Figure 2:
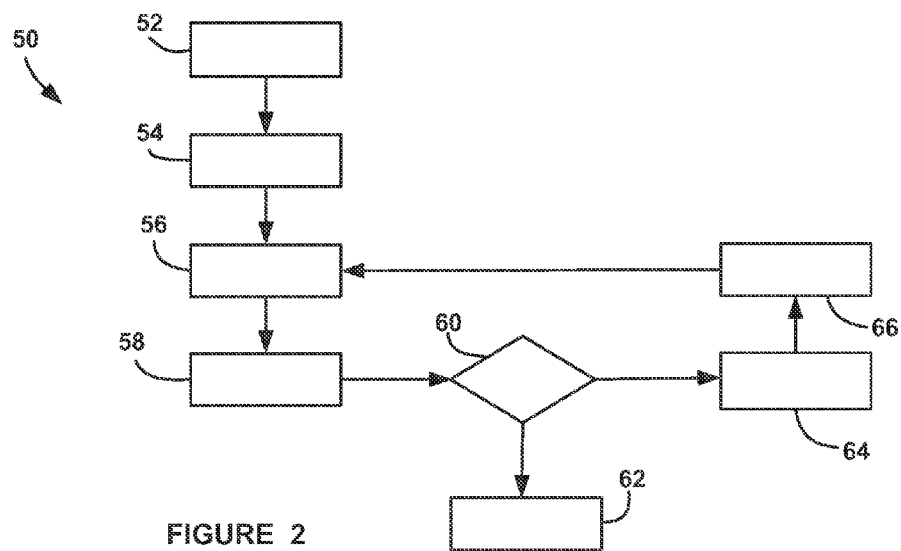
FIG. 2 is a flow chart diagram showing an operation for utilizing a pressurized volume of oxygen available in a cathode plumbing volume of the fuel cell system.

FIG. 2 is a flow chart diagram 50 showing a process for utilizing a pressurized volume of oxygen available in the cathode plumbing volume of the fuel cell system 10 during power down-transients. As stated above, the fuel cell stack 12 may contain a large amount of oxygen during the beginning of a power down-transient. Thus, the algorithm, described in detail below, dynamically considers stack oxygen capacity and calculates an available accumulated oxygen in the stack 12 during power down-transients.

The amount of oxygen that is available for generating power is calculated at box 52 based on an air balance and oxygen balance at the beginning of a power down-transient of the fuel cell stack 12. Oxygen that is inside the stack 12 during the power down-transient, $dmol_{stck}^{O_2}(t)$, will be available for a maximum current and is calculated as:

$$dmol_{stck}^{O_2}(t)=dmol_{In}^{O_2}(t)+dmol_{stck}^{O_2}(t-dt)-dmol_{reaction}^{O_2}(t)-dmol_{Out}^{O_2}(t), \quad (1)$$

where:

$$dmol_{In}^{O_2}(t) = dmol_{In}^{Air}(t) * y_{In}^{O_2}(t), \quad (2)$$

$$dmol_{stck}^{O_2}(t-dt) = dmol_{stck}^{Air}(t-dt) * y_{Out}^{O_2}(t-dt) = \frac{p_{Stck} * V_{Ca}}{R * T_{CoolOut}} * y_{Out}^{O_2}, \quad (3)$$

$$dmol_{reaction}^{O_2}(t) = f(I), \quad (4)$$

$$dmol_{Out}^{O_2}(t) = dmol_{Out}^{Air}(t) * y_{Out}^{O_2}(t), \quad (5)$$

where $p_{stck}$ is stack pressure, $V_{Ca}$ is the volume of the cathode side of the stack 12, R is the gas constant (8.314 J/K·mol), and $T_{CoolOut}$ is the temperature of a coolant outlet of the fuel cell stack 12.

For the air mass balance, air staying inside the stack 12 may be calculated as:

$$dmol_{Out}^{Air}(t)=dmol_{In}^{Air}(t)+dmol_{stck}^{Air}(t-dt)+dmol_{reaction}^{Air}(t)-dmol_{stck}^{Air}(t), \quad (6)$$

where:

$$dmol_{reaction}^{Air}(t)=dmol_{reaction}^{O_2}(t)=f(I). \quad (7)$$

The water generated in the fuel cell chemical reactions is assumed to be water vapor. Therefore, based on the chemical reactions, one mole of oxygen is consumed in the reaction and two moles of water vapor will be generated. Thus, the net air increment during the reaction is one mole, which is equal to the amount of oxygen consumed in the fuel cell chemical reactions. The air staying inside the stack 12 is calculated as:

$$dmol_{stck}^{Air} = \frac{p_{Stck} * V_{Ca}}{R * T_{CoolOut}}. \quad (8)$$

When the term $y_{Out}^{O_2}$ is the oxygen mole fraction in the air stream coming out of the stack 12, which is assumed to be equal to the oxygen mole fraction staying in the stack 12, the oxygen mole fraction is calculated as:

$$y_{Out}^{O_2} = \frac{dmol_{stck}^{O_2}(t)}{dmol_{stck}^{Air}(t)}. \quad (9)$$

Using the equation set forth above, the oxygen mole fraction in the air stream coming out of the stack, $y_{Out}^{O_2}$, and the oxygen mole fraction staying in the stack 12, may be determined at box 54. Next, a maximum current draw based on $dmol_{stck}^{O_2}(t)$ is determined at box 56. The maximum current draw may include a safety margin to avoid stack voltage collapse. For example, the maximum current draw may be determined based on half of the determined $dmol_{stck}^{O_2}(t)$ in the stack 12.

Once the maximum current draw is determined at the box 56, the algorithm draws a predetermined amount of current that is less than the maximum current draw for a period of time at box 58. The current that is drawn from the stack 12 is from current that is generated using the oxygen available for fuel cell reactions as calculated above. While the current is being drawn at the box 58, the algorithm determines if the voltage of the stack 12 drops below a predetermined threshold value, as measured by the voltage meter 28, at decision diamond 60. If the voltage drops below the predetermined threshold value during the current draw, as determined at the decision diamond 60, the algorithm ends at box 62.

The algorithm described is a dynamic algorithm. Thus, once the maximum current draw is determined at the box 56 based on the air/oxygen balance at the beginning of the power down-transient at the box 52, and the specified amount of amps are drawn from the fuel cell stack 12 at the box 58, the algorithm recalculates the air/oxygen balance for a next time-step at box 64 if the voltage of the stack 12 does not fall below the predetermined threshold at the decision diamond 60. Next, the algorithm calculates the moles of oxygen that are available for the fuel cell chemical reactions at box 66. Using the information from the box 66, the algorithm returns to box 56 and determines a maximum current draw and proceeds as discussed above. An exemplary current draw that may be drawn from the fuel cell stack 12 is 300 amps for 800 ms. However, the current draw will vary depending on the estimated cathode oxygen available for the fuel cell reactions.

As will be well understood by those skilled in the art, the several and various steps and processes discussed herein to describe the invention may be referring to operations performed by a computer, a processor, or other electronic calculating device that manipulates and/or transforms data using electrical phenomenon. Those computers and electronic devices may employ various volatile and/or non-volatile memories including non-transitory computer-readable medium with an executable program stored thereon including various code or executable instructions able to be performed by the computer or processor, where the memory and/or computer-readable medium may include all forms and types of memory and other computer-readable media.

The foregoing discussion disclosed and describes merely exemplary embodiments of the present invention. One skilled in the art will readily recognize from such discussion and from the accompanying drawings and claims that various changes, modifications and variations can be made therein without departing from the spirit and scope of the invention as defined in the following claims.

What is claimed is:

1. A method for utilizing a pressurized volume of oxygen in a cathode plumbing of a fuel cell system including a fuel cell stack, said method comprising:
    calculating an air/oxygen balance that is based on an air balance and an oxygen balance in the cathode plumbing, wherein calculating the air/oxygen balance includes assuming that an oxygen mole fraction in an air stream exiting the fuel cell stack is equal to an oxygen mole fraction that is staying in the stack;
    determining the number of moles of oxygen available for fuel cell chemical reactions using the calculated air/oxygen balance; and
    drawing current from the fuel cell stack using the moles of oxygen available for fuel cell chemical reactions.

2. The method according to claim 1 wherein calculating the air/oxygen balance includes calculating the air/oxygen balance at a beginning of a power down-transient of the fuel cell stack.

3. The method according to claim 1 further comprising determining a maximum current draw based on the determined number of moles of oxygen that are available for fuel cell chemical reactions, said maximum current draw being determined based on half of the determined number of moles of oxygen that are available.

4. The method according to claim 1 wherein calculating the air/oxygen balance includes calculating the air/oxygen balance based on oxygen flowing into the fuel cell stack and oxygen flowing out of the fuel cell stack.

5. The method according to claim 1 further comprising monitoring a fuel cell stack voltage while drawing current from the fuel cell stack using the moles of oxygen available.

6. The method according to claim 5 further comprising ending the draw of current from the fuel cell stack using the moles of oxygen available if the fuel cell stack voltage drops below a predetermined threshold.

7. The method according to claim 5 further comprising recalculating the air/oxygen balance and drawing a new current from the fuel cell stack based on a determined number of moles of oxygen available for fuel cell chemical reactions if fuel cell stack voltage does not drop below a predetermined threshold.

8. A method for utilizing a pressurized volume of oxygen in a cathode plumbing of a fuel cell system including a fuel cell stack, said method comprising:
    calculating an air/oxygen balance that is based on an air balance and an oxygen balance in the cathode plumbing at the beginning of a power down-transient of the fuel cell stack, wherein calculating the air/oxygen balance includes assuming that an oxygen mole fraction in an air stream exiting the fuel cell stack is equal to an oxygen mole fraction that is staying in the stack;
    determining a first number of moles of oxygen available for fuel cell chemical reactions using the calculated air/oxygen balance;
    drawing a first current from the fuel cell stack using the first number of moles of oxygen available for fuel cell chemical reactions;
    recalculating the air/oxygen balance that is based on an air balance and an oxygen balance in the cathode plumbing after the first draw of current is complete;
    determining a next number of moles of oxygen available for fuel cell chemical reactions using the calculated air/oxygen balance; and
    drawing a next current from the fuel cell stack using the next number of moles of oxygen available for fuel cell chemical reactions.

9. The method according to claim 8 further comprising stopping current from being drawn from the fuel cell stack when the determined number of moles of oxygen available for fuel cell chemical reactions is approximately zero.

10. The method according to claim 8 further comprising determining a maximum current draw based on the determined number of moles of oxygen that are available for fuel cell chemical reactions.

11. The method according to claim 10 wherein the maximum current draw includes a safety margin, said safety margin being determined based on half of the determined number of moles of oxygen available for the fuel cell chemical reactions.

12. The method according to claim 8 further comprising monitoring a fuel cell stack voltage while drawing current from the fuel cell stack using the moles of oxygen available.

13. The method according to claim 12 further comprising ending the draw of current from the fuel cell stack using the moles of oxygen available if fuel cell stack voltage drops below a predetermined threshold.

14. A system for utilizing a pressurized volume of oxygen in a cathode plumbing of a fuel cell system including a fuel cell stack, said system comprising:
    a controller that is programmed to perform the following:
    means for calculating an air/oxygen balance that is based on an air balance and an oxygen balance in the cathode plumbing, wherein calculating the air/oxygen balance includes assuming that an oxygen mole fraction in an air stream exiting the fuel cell stack is equal to an oxygen mole fraction that is staying in the stack;

means for determining the number of moles of oxygen available for fuel cell chemical reactions using the calculated air/oxygen balance; and means for drawing current from the fuel cell stack using the moles of oxygen available for fuel cell chemical reactions to charge a battery.

15. The system according to claim 14 wherein the means for calculating the air/oxygen balance calculates the air/oxygen balance at a beginning of a power down-transient of the fuel cell stack.

16. The system according to claim 14 further comprising means for determining a maximum current draw based on the determined number of moles of oxygen that are available for fuel cell chemical reactions and a safety margin, said safety margin being determined based on half of the determined number of moles of oxygen available for the fuel cell chemical reactions.

17. The system according to claim 14 wherein the means for calculating the air/oxygen balance calculates the air/oxygen balance based on oxygen flowing into the fuel cell stack and oxygen flowing out of the fuel cell stack.

18. The system according to claim 14 further comprising means for monitoring a fuel cell stack voltage while drawing current from the fuel cell stack using the moles of oxygen available.

19. The system according to claim 18 further comprising means for recalculating the air/oxygen balance and drawing a new current from the fuel cell stack based on a determined number of moles of oxygen available for fuel cell chemical reactions if fuel cell stack voltage does not drop below a predetermined threshold.

* * * * *